No. 877,720. PATENTED JAN. 28, 1908.
F. R. KIRCHHOFF.
PIPE COUPLING AND VALVE.
APPLICATION FILED SEPT. 23, 1907.
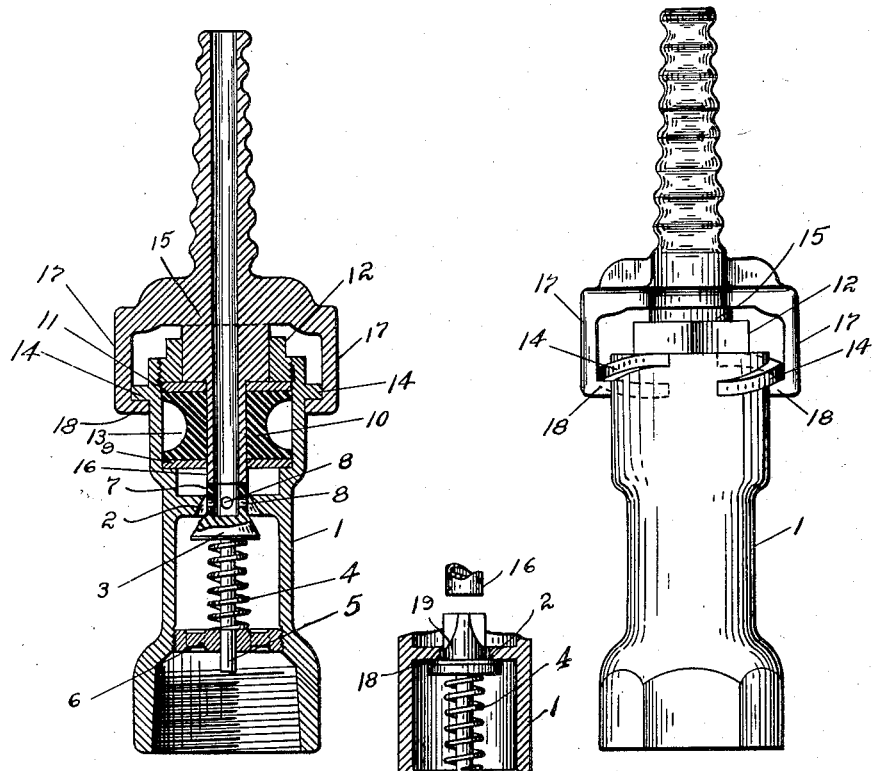
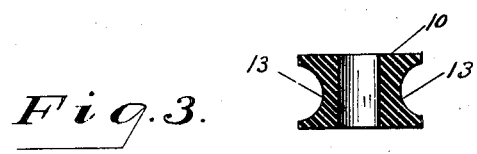
WITNESSES:
Walter A. Greenburg
A. M. Dow
INVENTOR:
FRANK R. KIRCHHOFF.
BY Barthel & Barthel
ATTORNEYS.

UNITED STATES PATENT OFFICE.

FRANK R. KIRCHHOFF, OF DETROIT, MICHIGAN.

PIPE-COUPLING AND VALVE.

No. 877,720.　　　　Specification of Letters Patent.　　　　Patented Jan. 28, 1908.

Application filed September 23, 1907. Serial No. 394,103.

*To all whom it may concern:*

Be it known that I, FRANK R. KIRCHHOFF, a citizen of the United States of America, residing at Detroit, in the county of Wayne and State of Michigan, have invented certain new and useful Improvements in Pipe-Couplings and Valves, of which the following is a specification, reference being had therein to the accompanying drawings.

This invention relates to a combined pipe coupling and valve and consists in the matters hereinafter set forth, and more particularly pointed out in the appended claims.

Referring to the drawings, Figure 1 is a view in longitudinal section of a coupling and valve embodying features of the invention. Fig. 2 is a view in side elevation of the coupling. Fig. 3 is a view in detail of a packing ring. Fig. 4 is a view in detail of a guide bridge. Fig. 5 is a view in detail of a modified form of valve closure.

In the drawings, a cylindrical valve casing 1 which forms one member of the coupling has an apertured valve seat 2 mediate its ends preferably integral with its wall, on which a conical valve closure 3 is yieldingly held by a spring 4 encircling a stem 5 secured to or integral with the closure, the spring being confined by a guide bridge 6 screwed into the casing in which the stem is longitudinally movable. An annular flange 7 on the closure projects through the valve seat and a plurality of apertures 8 are formed therein. The casing is counterbored at its end opposite the bridge and an annular washer 9 is seated at the bottom of the resultant recess. A packing ring 10 of rubber or other suitable elastic material is secured against the washer 9 by an outer washer 11 and exteriorly screw-threaded nut 12 engaging the casing, the aperture of the nut being larger than the aperture of the washer. The body of the packing ring is reduced between its ends by a peripheral groove 13. A pair of segmental helical flanges 14 with an interval between their adjacent ends are integrally formed on the counterbored end of the casing and are in effect portions of a double screw-thread. The other member of the coupling is a hollow cylindrical spindle 15 having a reduced inner end 16 adapted to closely fit the apertures of the packing ring 10 and its washers 11 and 12, and to abut against the flange 7 on the valve closure 3 when the shoulder between the body of the spindle and the reduced part rests on the outer washer 11.

Oppositely extending radial wings 17, are integrally formed or secured on the spindle with dependent inturned ends 18 adapted to drop between the ends of the casing flanges 14 and hook under them when given a part turn, the parts being so adjusted that their action projects the spindle far enough against the valve closure 3 to raise the latter from its seat and allow free passage from the interior of the spindle through the valve closure flange apertures and past the valve seat. This twisting of the spindle into the casing forces in the outer packing ring washer and compresses the ring, the latter buckling inwardly and tightly gripping the spindle with its reduced middle portion and springing back and allowing the ready withdrawal of the spindle when the latter is disengaged from the flange. As a result a packing joint is obtained which does not leak under heavy air pressure without any undue multiplication of parts or complexity of construction, while the life of the packing is increased by the kneading given it in use, thus preventing the hardening and loss of elasticity which occurs when the packing is not disturbed or moved.

The valve closure may, if preferred, be flat as indicated in Fig. 5, with a suitable packing ring 18, and a cylindrical extension 19 passing through the valve seat 2.

What I claim as my invention is:—

A combined pipe coupling and valve comprising a cylindrical casing, a pair of segmental helical flanges near one end thereof, a washer seated in an axial counterbored recess at the flanged end of the casing, an elastic packing ring on the washer having an outer peripheral groove between its ends, a washer resting on the outer end of the ring, a check-nut in the casing limiting the outward movement of the outer washer, a tubular spindle reciprocable through the check-nut having arms adapted to detachably interlock with the flange and a reduced extension extending through the nuts and ring, an apertured valve bridge removably secured in the other end of the casing, an apertured valve seat between the bridge and casing in axial alinement therewith, a valve closure having a stem reciprocable in the bridge, and an annular perforated flange extending through the seat and abutting the spindle extension, and a spring encircling the stem in compression between the bridge and closure, said spindle being adapted to longitudinally compress the ring and to force the valve closure from the seat when its arms are interlocked with the casing flanges, and said ring being adapted to buckle inwardly and forcibly grip the spindle with its middle body portion when compressed.

In testimony whereof I affix my signature in presence of two witnesses.

FRANK R. KIRCHHOFF.

Witnesses:
 A. M. DORR,
 C. R. STICKNEY.